US010599692B2

(12) United States Patent
Dettinger et al.

(10) Patent No.: US 10,599,692 B2
(45) Date of Patent: *Mar. 24, 2020

(54) MODIFICATION OF A SAVED DATABASE QUERY BASED ON A CHANGE IN THE MEANING OF A QUERY VALUE OVER TIME

(75) Inventors: Richard Dean Dettinger, Rochester, MN (US); Daniel Paul Kolz, Rochester, MN (US); Kyong Jin Shim, Rochester, MN (US); Alan Benjamin Swanson, Pine Island, MN (US); Marie Renee Wilkening, Medford, WI (US)

(73) Assignee: International Business Machines Corporation, Armonk, NY (US)

( * ) Notice: Subject to any disclaimer, the term of this patent is extended or adjusted under 35 U.S.C. 154(b) by 2541 days.

This patent is subject to a terminal disclaimer.

(21) Appl. No.: 12/191,428

(22) Filed: Aug. 14, 2008

(65) Prior Publication Data

US 2008/0301109 A1    Dec. 4, 2008

Related U.S. Application Data

(63) Continuation of application No. 11/366,882, filed on Mar. 2, 2006, now abandoned.

(51) Int. Cl.
*G06F 7/00* (2006.01)
*G06F 17/30* (2006.01)
*G06F 16/332* (2019.01)

(52) U.S. Cl.
CPC ................................. *G06F 16/3322* (2019.01)

(58) Field of Classification Search
CPC ............. G06F 16/3322; G06F 16/3323; G06F 16/3325

USPC .......................... 707/766, 759, 765, 999.004
See application file for complete search history.

(56) References Cited

U.S. PATENT DOCUMENTS

| 5,265,246 A | 11/1993 | Li et al. |
| 5,418,950 A | 5/1995 | Li et al. |
| 5,428,776 A | 6/1995 | Rothfield |
| 5,495,604 A | 2/1996 | Harding et al. |
| 5,999,192 A | 12/1999 | Slefridge et al. |
| 6,366,915 B1 * | 4/2002 | Rubert et al. ................. 707/770 |
| 6,725,227 B1 | 4/2004 | Li |
| 6,877,015 B1 * | 4/2005 | Kilgore et al. ............... 707/700 |
| 7,283,997 B1 * | 10/2007 | Howard et al. .................... 707/3 |
| 7,392,249 B1 * | 6/2008 | Harris ............... G06F 17/30864 707/999.004 |
| 7,454,457 B1 * | 11/2008 | Lowery ................... H04L 47/10 709/224 |
| 2001/0051943 A1 * | 12/2001 | Drucker et al. .................. 707/3 |

(Continued)

*Primary Examiner* — Md I Uddin
(74) *Attorney, Agent, or Firm* — Martin & Associates, LLC; Bret J. Petersen

(57) ABSTRACT

An apparatus and method modify a saved query based on a change in a query value meaning that changes over time. In preferred embodiments a graphical query interface displays an option to adjust query values of a saved database query. A query adjustment mechanism then adjusts the value of the query to compensate for the change in the meaning of the query value since the query was created such that the adjusted query will have the same basic meaning as when the query was originally created. Preferred Embodiments allow the user to specify to adjust the query to the current date or to a specified date in the past.

4 Claims, 5 Drawing Sheets

(56) References Cited

U.S. PATENT DOCUMENTS

| | | |
|---|---|---|
| 2002/0178158 A1* | 11/2002 | Kanno ............................ 707/5 |
| 2003/0071837 A1 | 4/2003 | Sorenson et al. |
| 2003/0125983 A1 | 7/2003 | Flack et al. |
| 2004/0030717 A1 | 2/2004 | Caplin |
| 2004/0034633 A1 | 2/2004 | Ricard |
| 2004/0243557 A1* | 12/2004 | Broder ............... G06F 17/2785 707/999.003 |
| 2005/0049497 A1 | 3/2005 | Krishnan et al. |
| 2005/0131884 A1* | 6/2005 | Gross ............... G06F 17/30864 707/999.003 |
| 2005/0222981 A1* | 10/2005 | Lawrence et al. ............... 707/3 |
| 2005/0256852 A1* | 11/2005 | McNall et al. .................. 707/3 |
| 2005/0289133 A1* | 12/2005 | Arrouye ........... G06F 17/30067 707/999.004 |
| 2006/0080432 A1* | 4/2006 | Spataro .............. H04L 12/1831 709/224 |
| 2006/0224578 A1* | 10/2006 | Kadatch et al. ................. 707/5 |
| 2009/0259599 A1* | 10/2009 | Wallman .............. G06Q 40/00 705/36 R |

\* cited by examiner

MODIFICATION OF A SAVED DATABASE QUERY BASED ON A CHANGE IN THE MEANING OF A QUERY VALUE OVER TIME

CROSS-REFERENCE TO PARENT APPLICATION

This patent application is a continuation of U.S. Ser. No. 11/366,882 filed on Mar. 2, 2006, which is incorporated herein by reference.

BACKGROUND OF THE INVENTION

1. Technical Field

This invention generally relates to computer database systems, and more specifically relates to modification of a saved query based on a change in the meaning of a query value that changes with the passage of time.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records that satisfy the query are returned as the query result. A problem with using queries to retrieve information from a database is that it typically requires specialized knowledge of a query language, such as Structured Query Language (SQL), as well as detailed knowledge of the database and its relationships. User friendly query interfaces are being developed to provide a graphical query interface that allows a person that does not know SQL to construct queries to a database. For example, IBM Corporation has developed an object oriented framework known as a Data Discovery and Query Builder (DDQB). This framework abstracts out the query layer from the user and lets the user build queries using a graphical interface.

Using a graphical query interface such as the DDQB, a user can construct a query to extract desired information from the database. The graphical query interface allows the user to store the query for later use. However, after the passage of time, some of the values used in the stored query may become outdated. So the same query run in the future may not present the same relative information to the user as was intended when the query was created and saved. Parts of the query that have a time sensitive nature are not taken into consideration for future use of the query.

Without a way to modify the saved query that has time sensitive query values where the meaning of the query values change over time, the computer database industry will continue to suffer from the generation and storing of queries for future use that do not remain useful as the meaning of the values change over time.

DISCLOSURE OF INVENTION

According to the preferred embodiments, an apparatus and method modify a saved query based on a change in the meaning of a query value that changes over time. In preferred embodiments a graphical query interface displays an option to adjust query values of a saved database query. A query adjustment mechanism then adjusts the value of the query to compensate for the change in the query value since the query was created such that the adjusted query will have the same basic meaning as when the query was originally created. Preferred embodiments allow the user to specify to adjust the query to the current date or to a specified date in the past.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION 1.0 Overview

The present invention relates to database queries. For those not familiar with databases or queries, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, let's assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

One popular way to define a query uses Structured Query Language (SQL). SQL defines a syntax for generating and processing queries that is independent of the actual structure and format of the database. SQL is very powerful for those who have detailed knowledge of SQL and who have detailed knowledge of the database being queried. However, there are a growing number of circumstances where people who do not have a detailed knowledge of SQL or the database need to be able to query the database. As a result, graphical query interfaces have been developed that help a user to query a database even if the user does not know SQL and does not know the detailed relationships in the database. For example, IBM Corporation has developed an object oriented framework known as a Data Discovery and Query Builder. This framework abstracts out the query layer from the user and lets the user build queries using a graphical interface. For example, medical researchers that perform DNA mapping may need to access data in a very large database. A graphical query interface could be defined that uses the Data Discover and Query Builder framework that allows the researcher to access information in the database without writing SQL queries and without understanding many of the relationships in the database.

Figure 2:
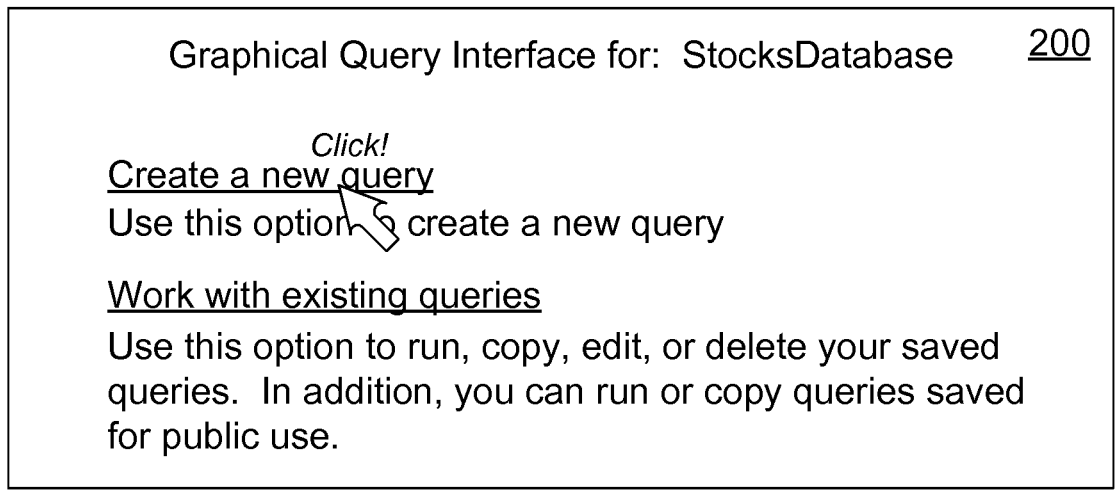
FIG. 2 is a display of one sample screen in a known graphical query interface.
Figure 3:
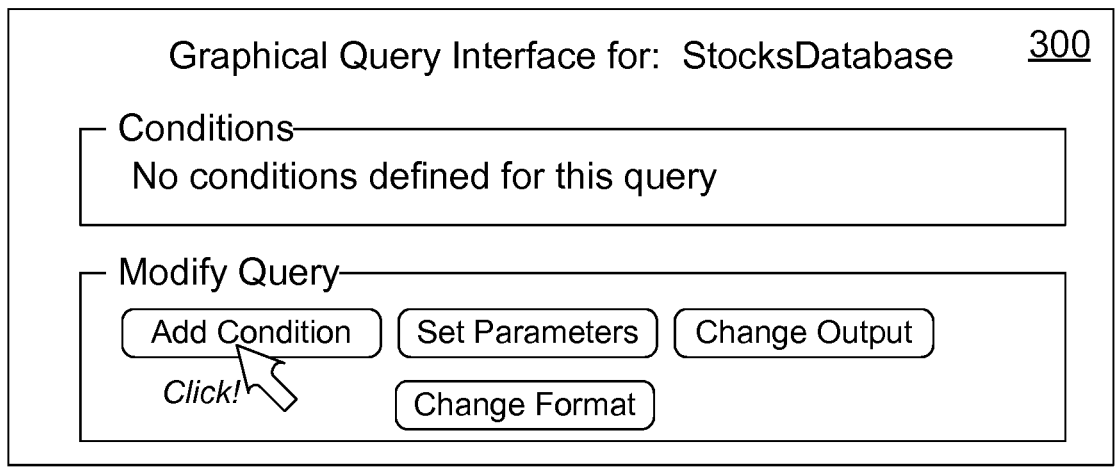
FIG. 3 is a display of a sample screen in a known graphical query interface that is displayed in response to the user selecting the "Create a new query" link on the display in FIG. 2.
Figure 4:
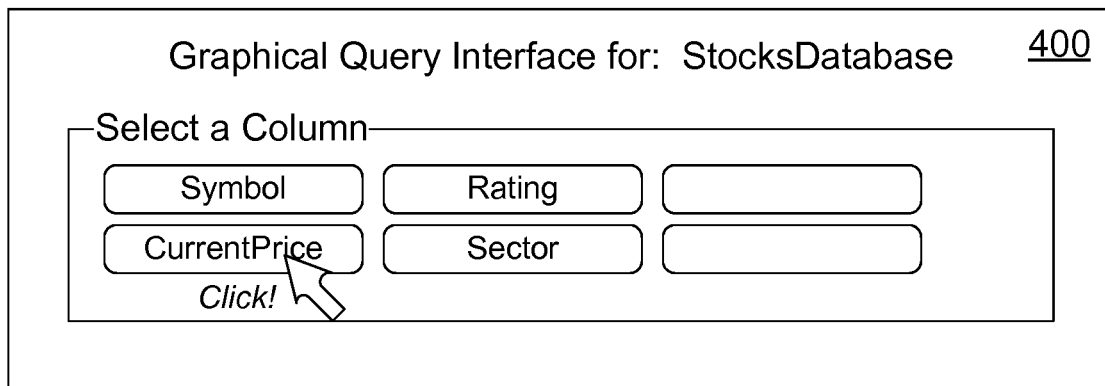
FIG. 4 is a display of a sample screen in a known graphical query interface that is displayed in response to the user selecting the Add Condition button in the display of FIG. 3.
Figure 5:
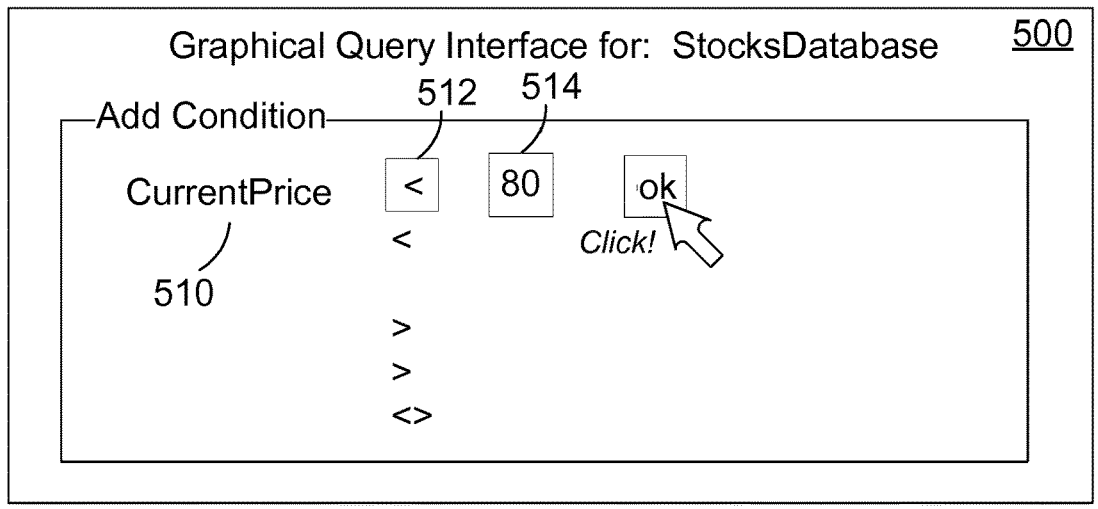
FIG. 5 is a display of a sample screen in a known graphical query interface that is displayed in response to the user selecting the CurrentPrice button in the display of FIG. 4.
Figure 6:
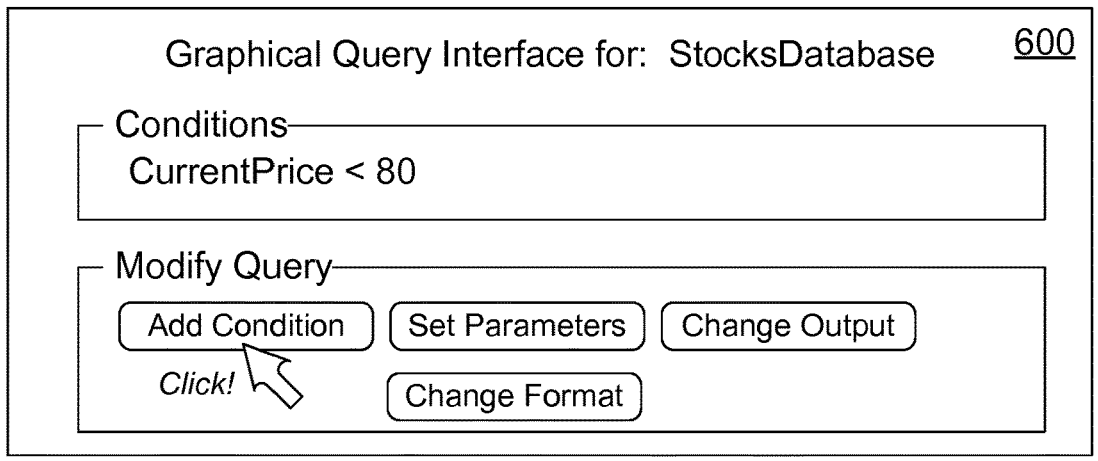
FIG. 6 is a display of a sample screen in a known graphical query interface that is displayed once the user has selected the "OK" button in the display of FIG. 5.
Figure 7:
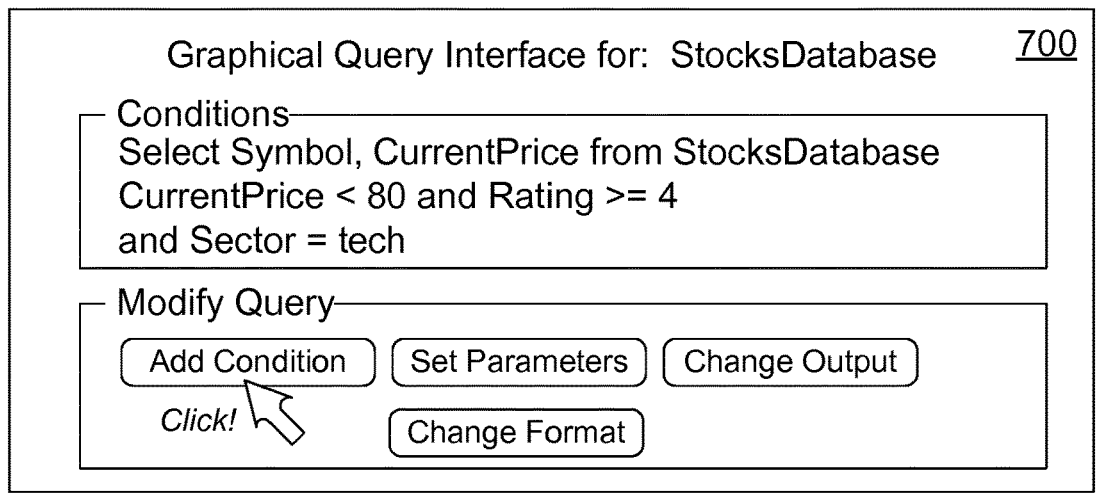
FIG. 7 is a display of a sample screen in a known graphical query interface that is displayed in response to the user adding other conditions in a similar manner as in the display of FIG. 2 through FIG. 5.

Referring to FIG. 2, a display window 200 shows a graphical query interface for a database called StocksDatabase. We assume for this example that the user clicks on the "Create a new query" link. In response, the display window 300 of FIG. 3 is displayed to the user. Note that no conditions have been defined for the new query, so the user clicks on the "Add Condition" button. In response, the display window 400 of FIG. 4 is displayed to the user. We assume for this example that the user selects the CurrentPrice Array by clicking on the corresponding button, as shown in FIG. 4. In response, the display window 500 is displayed to the user, allowing the user to set a condition for the CurrentPrice. To set the condition, the user is displayed the field "CurrentPrice" 510 and allowed to set up the condition by selecting an operator 512 and a value 514. In the illustrated example, the user selects the "<" operator, types in "80" for the value 514. After the user then clicks on the OK button in the display window 500 of FIG. 5, the display window 600 of FIG. 6 is displayed to the user. Note that the Conditions portion of the display window 600 now shows that the user has created the condition "Current Price <80". We assume the user now clicks on the Add Condition button, as shown in and adds further conditions to the query to build the query as shown in FIG. 7

The query shown in FIG. 7 can be saved by the user for later use. However, the query will not necessarily have the same meaning to the user as the literal values of the query change over time. For example, if at a later date the saved query shown in FIG. 7 is executed, but the stock price has changed significantly in comparison to the query value of 80, then the meaning of the query as created by the user has been compromised. The described embodiments below allow the user to autonomically adjust the query values where the meaning of those query values change over time.

2.0 Description of the Preferred Embodiments

The graphical query interface in accordance with the first embodiment of the present invention provides a way to adjust the query values where the meaning of the values change over time to preserve the meaningfulness of a saved query.

Figure 1:
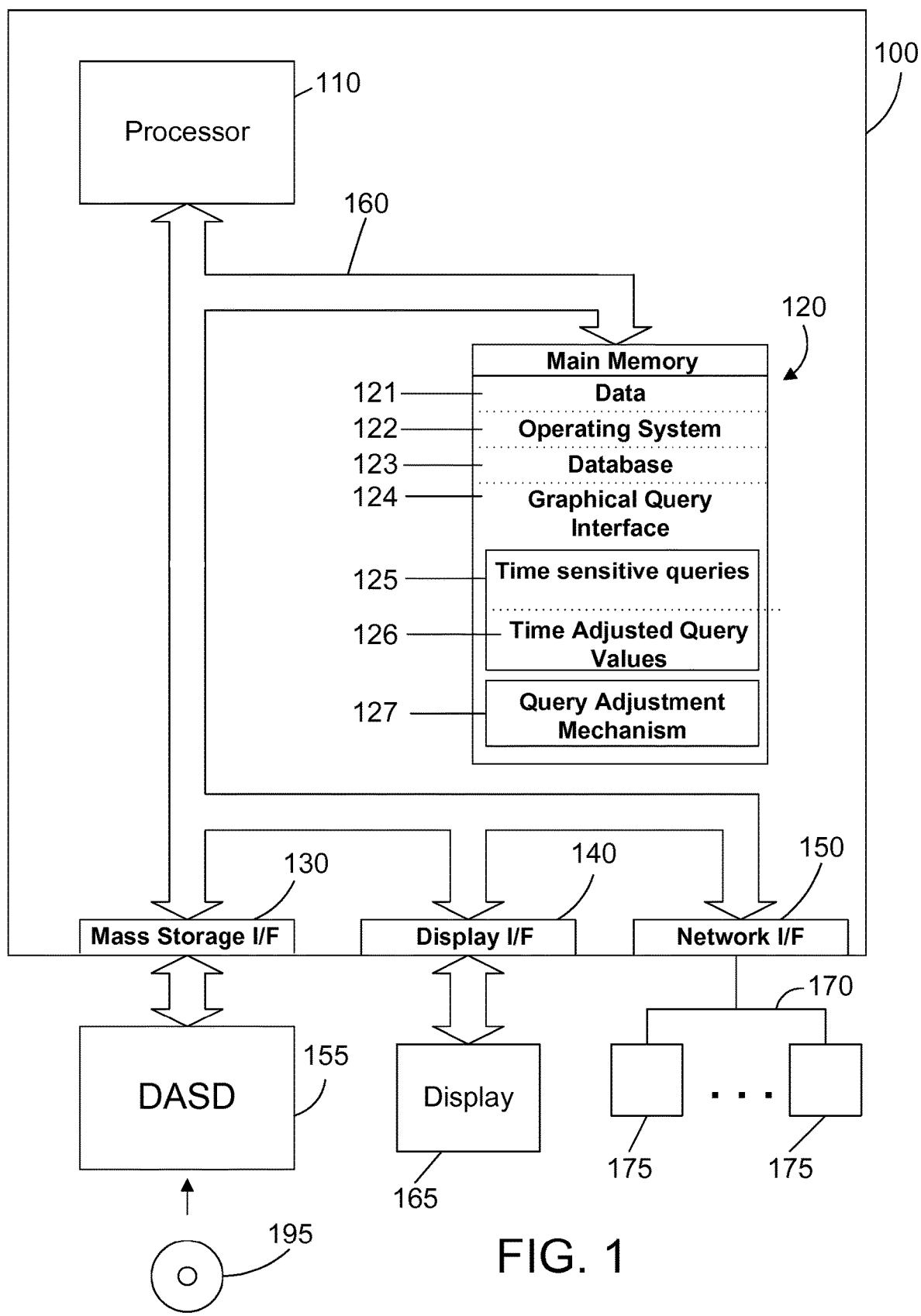
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a database 123, and a graphical query interface 124. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. Database 123 is any suitable database, whether currently known or developed in the future. Database 123 preferably includes one or more tables. Graphical query interface 124 provides an interface that helps the user create and build a query that retains its value over time. The graphical query interface 124 includes one or more time sensitive queries 125 that are created by a user and have one or more time adjusted query values 126. The graphical query interface 124 also includes a query adjustment mechanism 127. This mechanism helps the user to adjust the values of the time sensitive queries as described further below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, and graphical query interface 124 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links. Note that the preferred signal bearing media is tangible.

Figure 8:
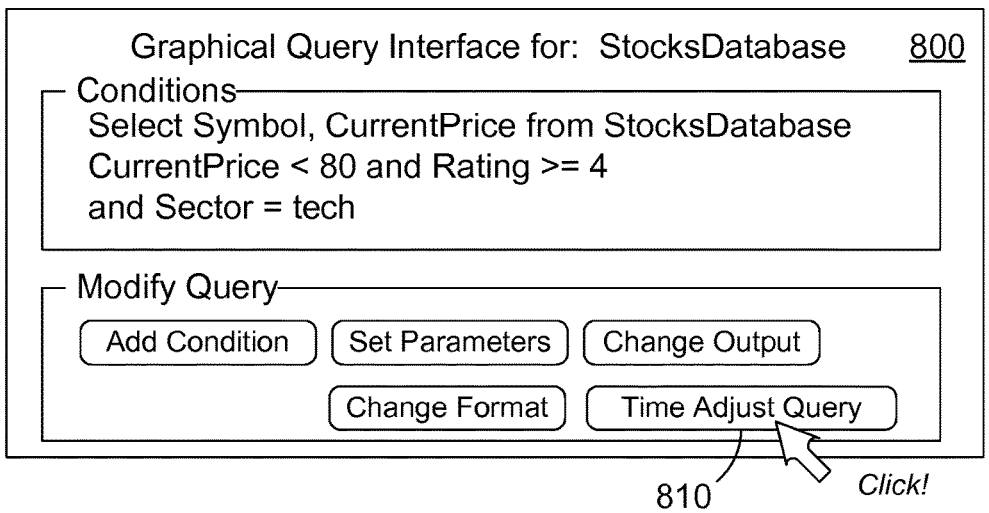
FIG. 8 is a display of a sample screen of a graphical query interface according to preferred embodiments.
Figure 9:
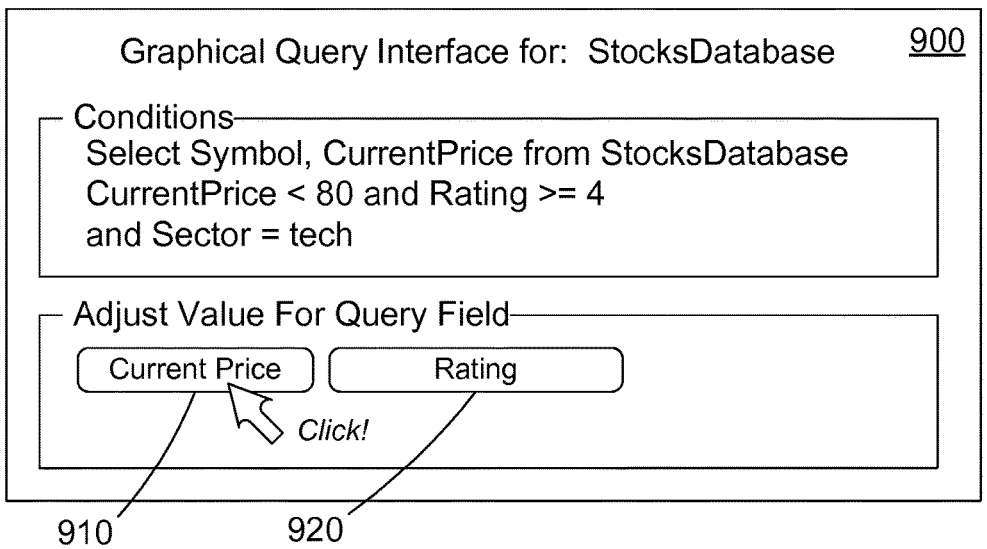
FIG. 9 is a display of a sample screen of a graphical query interface according to preferred embodiments that is displayed once the user has selected the "Time Adjust Query" button in the display of FIG. 8.

Referring now to FIG. 8, additional details of the graphical query interface 124 shown in FIG. 1 are described according to preferred embodiments. The display window 800 represents a graphical query interface 124 with the same query as described in the above example with reference to FIGS. 2 through 7. In this preferred embodiment, the graphical query interface 124 further includes an option to time adjust a query. The user selects the option to time adjust a query by clicking on the time adjust query button 810 as shown. In response to the user's selection, the graphical query interface 124 determines fields of time sensitive queries 125 (FIG. 1) that can be adjusted and displays the window 900 as shown in FIG. 9. Fields that have values that can be adjusted may include those query fields that have historical information available in the database.

Figure 10:
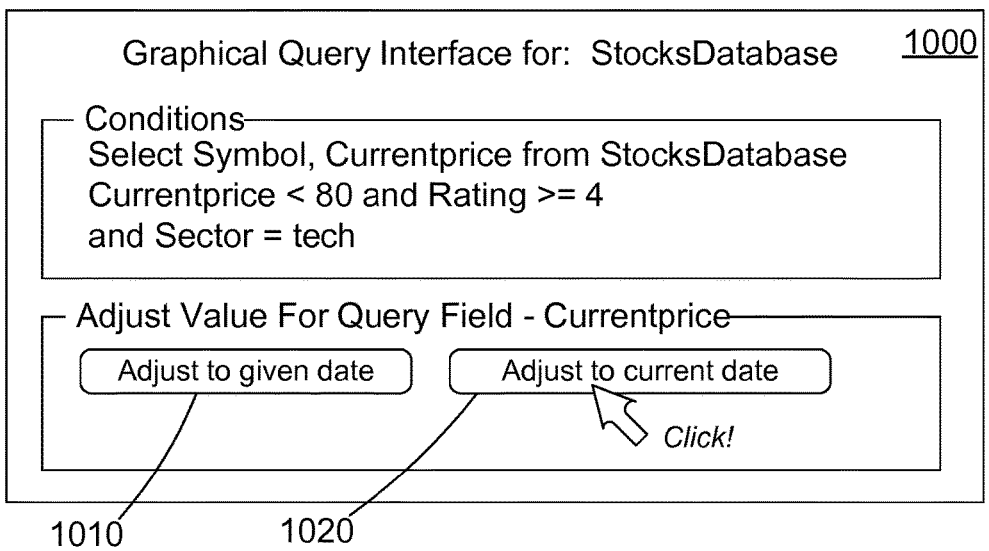
FIG. 10 is a display of a sample screen of a graphical query interface according to preferred embodiments that is displayed in response to the user selecting the "CurrentPrice" button in FIG. 9.

Again referring to FIG. 9, in the present example, the current price 910 and the rating 920 are determined to be time sensitive values that can be adjusted and are displayed in the window 900. For this example, the user then selects the current price 910 as shown and the graphical query interface 124 then displays the window 1000 as shown in FIG. 10. The graphical query interface 124 allows the user to adjust the selected query field (CurrentPrice) to a given date 1010 or the current date 1020. If the user selects the given date 1010, then the user is given the option to enter a date (not shown) and then the query is modified based on the change in the value to the entered date. If the user selects adjust to current date 1020, then the query is modified based on the change in the query value of the field "Current Price" as described further below. In this example, the current price of the stocks in the database are assumed to have changed in a significant amount such that the original stored query as shown no longer retains the same meaning as when it was created.

In preferred embodiments, when the query is modified based on the change in a query value, it is the query value that is adjusted to realize a modified query that provides a query with the same basic meaning as when the query was originally created. According to preferred embodiments, a query is modified by running a query to get the historical data for the query and comparing that historical data with the query value to determine a time adjusted query value 126 (FIG. 1). For our example, the original query is executed to gather historical data by running the query with the date set to the time of the original query. In this Example, the historical query would be as follows:

Select symbol, currentprice from StocksDatabase where CurrentPrice<80 (Jan. 1, 2000) and rating>=4 and sector=tech Next, a query would be executed to determine the current data for the above query as follows:

Select symbol, currentprice from <StocksDatabase> where symbol in (symbol list from the previous query)

The new value for the query is then determined by the product of the original query value times the ratio of the current data/historical data. A new query is then formulated with this new query value by the query adjustment mechanism 127 (FIG. 1). In this example, the original query value times the ratio of the current data/historical data returns a query value of 62. The new query is as follows:

Select symbol, currentprice from StocksDatabase where CurrentPrice<62 (Jan. 1, 2000) and rating>=4 and sector=tech When a query is modified according to the preferred embodiments, the change in the query can be done with regard to other query values or without regard to them. In the above example, the query can be modified with regard to the stock rating or not depending on the desired outcome. When the modification is done with regard to the other query values, the other query values are included in the query to gather historical data for comparison as shown above. In contrast, when the modification is done without regard to other query values, the other values are not included in the query to gather historical data for the comparison.

Figure 11:
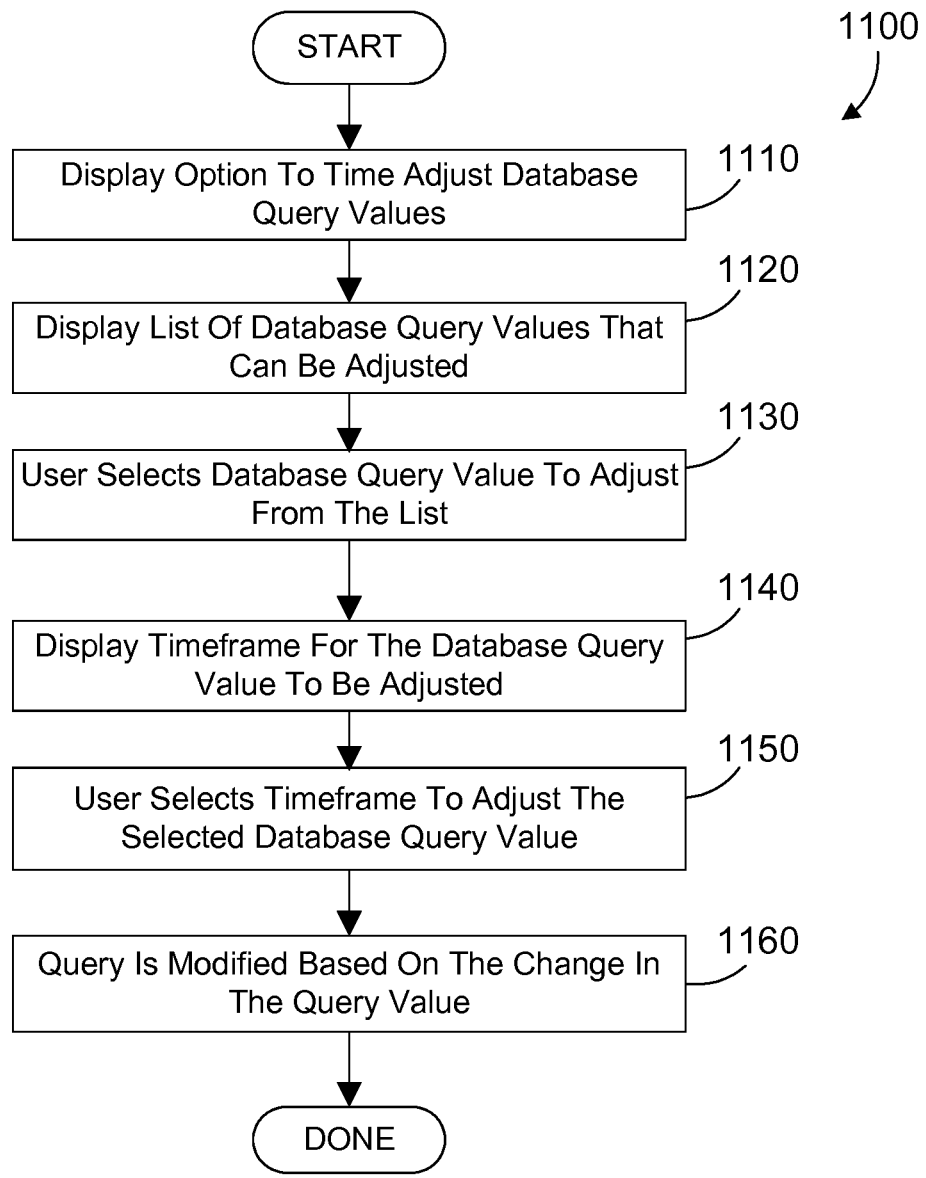
FIG. 11 is a method flow diagram for a graphical query interface according to preferred embodiments.

Referring to FIG. 11, a method 1100 in accordance with the preferred embodiments begins by displaying an option to the user to time adjust database query values (step 1110). Upon selection of the option in step 1110, the user is then presented with a selection of query values that can be adjusted (step 1120). The user then selects a database query value to adjust (step 1130) from the query values in step 1120. The user is then presented with a selection of the time frame for the database query value to be adjusted (step 1140). The user then selects the time frame to adjust the selected database query value (step 1150). The query is then modified based on the change in the query value (step 1160) depending on the time frame selected in step 1150. The method 1100 is then done.

As described above, an apparatus and method modify a saved query based on a change in a query value that changes over time. The query adjustment mechanism adjusts the value of the query to compensate for the change in the query value since the query was created such that the adjusted query will have the same basic meaning as when the query was originally created. In this way, the preferred embodiments overcome the staleness of saved queries in the prior art so that generation and execution of queries remain useful as the values of the query change over time.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the preferred embodiments have been shown with the query adjustment mechanism as part of a graphical query interface, the claimed embodiments hereby expressly include those embodiments where the query adjustment mechanism is included in other software to provide the described features.

The invention claimed is:

1. A computer-implemented method for a user to modify a query to a database, the method comprising the steps of:
   providing a graphical user interface that allows a user to create, store and modify queries;
   displaying to the user on the graphical user interface a query that was previously created and stored, where the query has a query value;
   displaying an option to the user to time adjust the query to compensate for a change in the query value since the query was created;
   in response to a user selection to time adjust the query, modifying the query based on a change in a meaning of the query value over time such that when executed the query will have the same meaning as when the query was originally created and stored;
   wherein the query is modified by adjusting the query value that has changed in meaning; and
   wherein the query value is adjusted to the product of an original query value and a current value returned by the query divided by a historical value returned by the query.

2. The method of claim 1 wherein the query is modified regarding other query values in the query.

3. An apparatus comprising:
   at least one processor;
   a memory coupled to the at least one processor;
   a database residing in the memory; and
   a graphical user interface that allows a user to create, store and modify queries with a query adjustment mechanism residing in the memory and executed by the at least one processor, wherein the graphical user interface displays to the user a query that was previously created and stored, where the query has a query value, and the query adjustment mechanism displays an option to time adjust the query to compensate for a change in the query value since the query was created, and in response to a user selection to time adjust the query adjusts the query based on a change in a query value that has occurred over a period of time such that the adjusted query when executed will have the same meaning as when the query was originally created and stored;
   wherein the query is adjusted by adjusting a query value and
   wherein the query value is adjusted to the product of an original query value and a current value returned by the query divided by a historical value returned by the query.

4. A program product comprising:
   (A) a graphical user interface that allows a user to create, store and modify queries with a query adjustment mechanism wherein the graphical user interface displays to the user a query that was previously created and stored, where the query has a query value, and the query adjustment mechanism displays an option to time adjust the query to compensate for a change in the query value since the query was created, and in response to a user selection to time adjust the query adjusts the query based on a change in a query value that has occurred over a period of time such that the adjusted query when executed will have the same meaning as when the query was originally created and stored;
   (B) non-transitory computer-recordable media bearing the graphical query interface;
   wherein the query is adjusted by adjusting a query value of the time sensitive query; and
   wherein the query value is adjusted to the product of an original query value and a current value returned by the query divided by a historical value returned by the query.

* * * * *